Sept. 1, 1953 A. J. STOCK 2,650,816
PRESSURIZED COAL SCALE
Filed March 27, 1951 4 Sheets-Sheet 1

INVENTOR
Arthur J. Stock
BY Stevens, Davis, Miller and Mosher
ATTORNEYS

Sept. 1, 1953 A. J. STOCK 2,650,816
PRESSURIZED COAL SCALE
Filed March 27, 1951 4 Sheets-Sheet 2

INVENTOR
Arthur J. Stock
BY Stevens, Davis, Miller & Mosher
ATTORNEYS

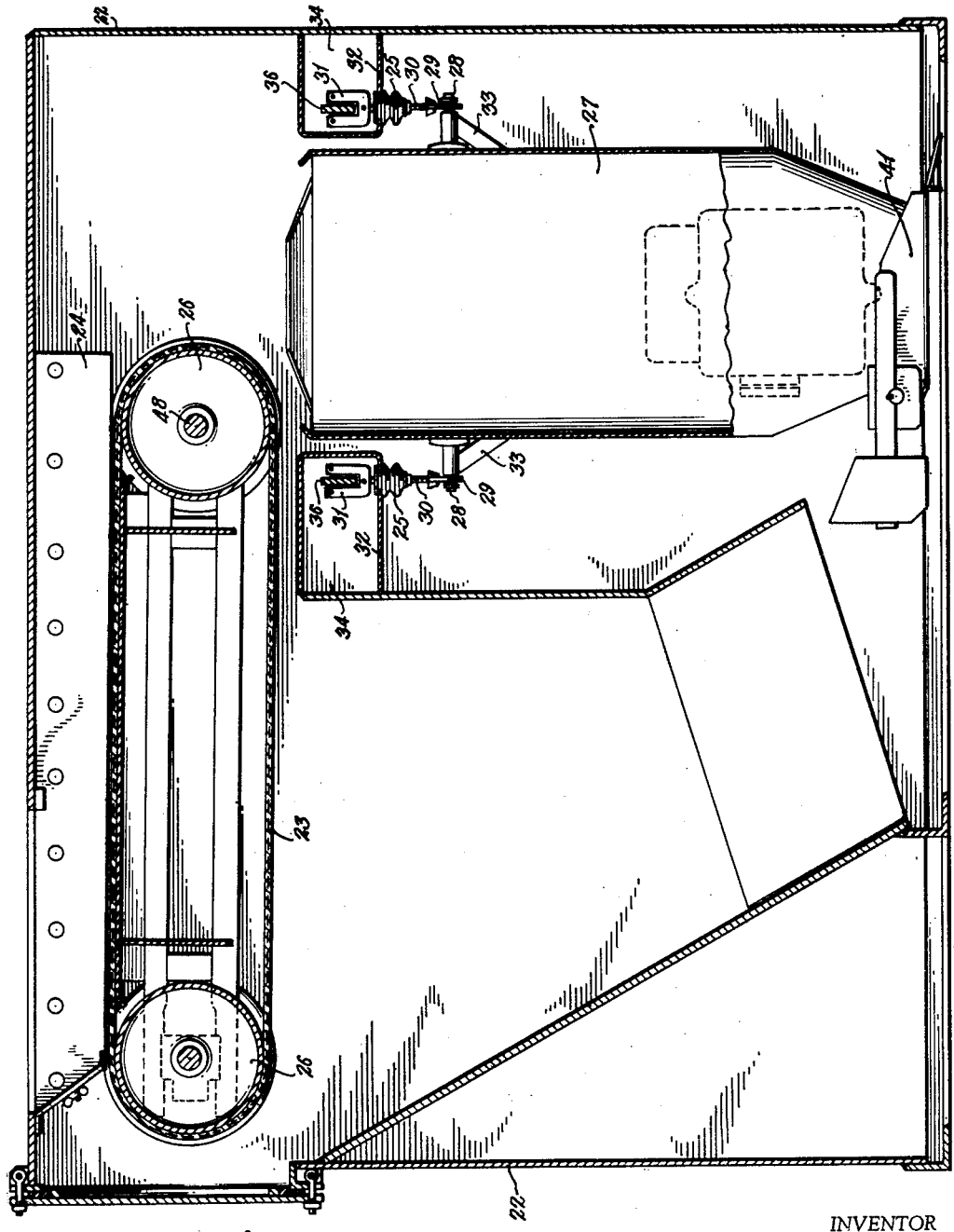

Sept. 1, 1953  A. J. STOCK  2,650,816
PRESSURIZED COAL SCALE
Filed March 27, 1951  4 Sheets-Sheet 4
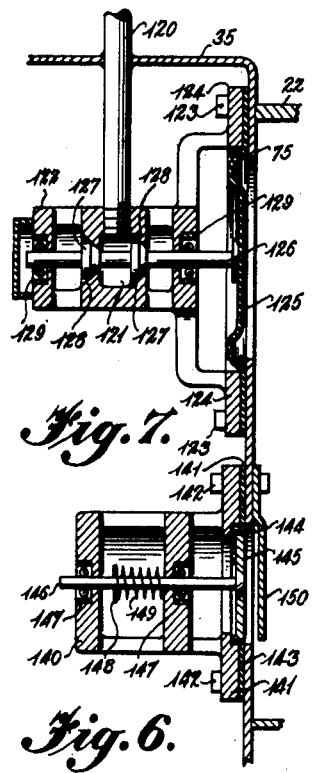
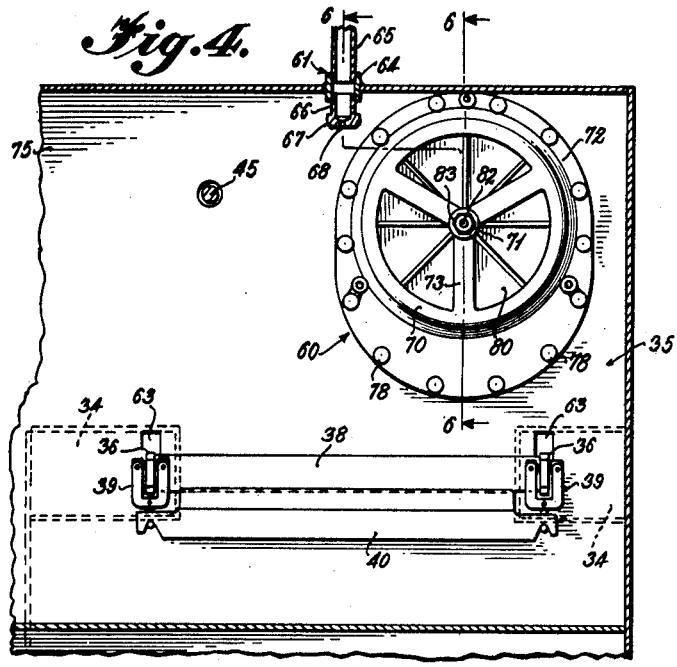
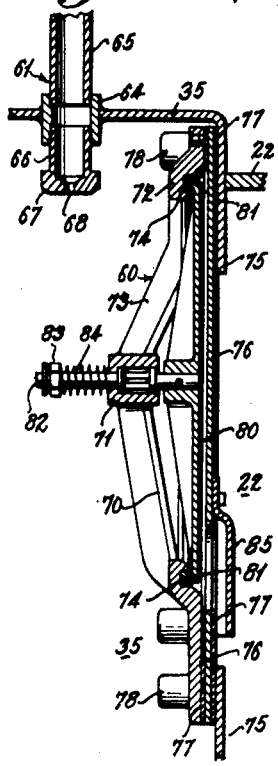
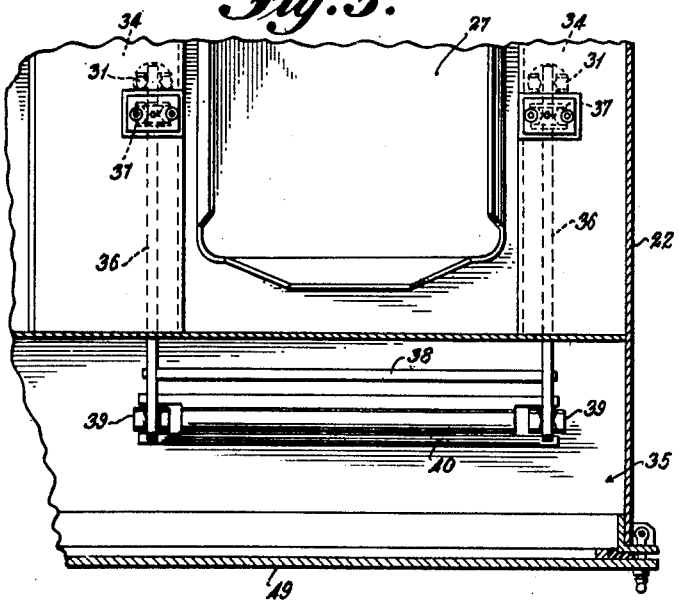
INVENTOR
*Arthur J. Stock*
BY *Stevens, Davis, Miller & Mosher*
ATTORNEYS Patented Sept. 1, 1953

2,650,816

UNITED STATES PATENT OFFICE 2,650,816

PRESSURIZED COAL SCALE

Arthur J. Stock, Cleveland, Ohio

Application March 27, 1951, Serial No. 217,716

7 Claims. (Cl. 265—27)

This invention relates to a pressurized scale and more particularly to a coal scale to be utilized with a pressure or vacuum feed to a furnace in a coal combustion system.

There are many instances where it is necessary and desirable to weigh materials in a hopper under pressure while maintaining the weighing lever assembly for the hopper separate and apart therefrom. This separation is usually an essential feature of arrangements of this nature, and is accomplished by utilizing independent pressure-tight compartments for the weigh hopper and weigh lever assembly. The separation is considered necessary to preserve the sensitive balance of the weigh lever assembly from distorting or destroying tendencies such as those caused by a deposition or accumulation of foreign materials upon the various levers. Also it serves to prevent the materials contained in the hopper from deleteriously affecting the lever assembly. For example, the materials may have corrosive or oxidizing effects upon the levers of the weigh lever assembly. Additionally, it is often considered desirable to have the lever assembly readily accessible for purposes of adjustment and that such access should be able to be obtained without interference with the materials in the hopper under pressure. As for example, during the weighing of coal the coal dust present is so great that unless the weigh lever assembly is kept separate from the weigh hopper, the coal dust will accumulate on the levers and cause corrosion and will otherwise interfere with the weighing operation.

The maintenance of separate pressure-tight compartments for the weigh hopper and the weigh lever assembly is extremely necessary for the previously described reasons. Nevertheless, merely maintaining the separation will not of itself result in accurate weighings. This is so in view of the pressure differential that exists between the weigh hopper compartment and the weigh lever assembly compartment inasmuch as the former is under pressure whereas the latter is generally at atmospheric pressure. This pressure difference is generally the result of the manner in which the furnace is operated. For example, use of a cyclone type furnace operating under pressure results in a back pressure throughout the feeding part of the system. Additionally, the only connection between the two compartments usually consists of two rods which are attached to the weigh hopper and which transmit the gross load of the weigh hopper plus the material contained therein to the weigh lever assembly. However, some scale hoppers employ three and sometimes four connecting rods to transmit the gross load. In order to make the joint between the compartments a pressure-tight seal, flexible seals in the form of molded rubber bellows are applied to the rods in a conventional manner. This sealing arrangement, however, further enlarges the weigh errors caused by dust accumulation since the unequal pressure caused by the weigh hopper compartment being under pressure results in the molded rubber bellows on the inside of the weigh hopper compartment producing an air piston action which manifests itself as a force acting directly to either raise the weigh hopper or to thrust the weigh hopper sideways.

Accordingly, this invention provides an arrangement for a pressurized scale whereby the pressure in the weigh hopper compartment is offset by maintaining the weigh lever assembly compartment under air pressure equal to or slightly greater than the pressure in the weigh hopper compartment. This is accomplished generally by providing an air inlet to the weigh lever assembly compartment or control compartment which is connected to a source of air under a pressure greater than any contemplated in the weigh hopper compartment. The air inlet which is normally closed, opens responsive to a large pressure differential between the two compartments in favor of the weigh hopper compartment and admits air into the control compartment until the pressure in the control compartment is slightly greater than the pressure in the weigh hopper compartment. A check valve is established between the two compartments so that if the pressure in the control compartment greatly exceeds that in the weigh hopper compartment, the check valve permits air from the control compartment to leak into the weigh hopper compartment until the pressure in the control compartment is only slightly greater than the pressure in the weigh hopper compartment. In this manner large pressure differentials in favor of either compartment are alleviated and accurate weighings can be effected.

It is an object of this invention to provide a pressurized scale which will give accurate weighings.

It is another object of this invention to provide a pressurized coal scale for use with a pressure or vacuum feed to a furnace system which will be more efficient, accurate, and economical than any which have heretofore been available.

Other objects and advantages of the present invention will become apparent from a detailed description of the following specification when taken in conjunction with the drawings in which:

Figure 3 is a view in vertical section of Figure 2 taken along line 3—3.

Figure 4 is a view in vertical section of Figure 2 taken along line 4—4.

Figure 5 is a view in horizontal section of Figure 2 taken along line 5—5;

Figure 6 is a view in vertical section of Figure 4 taken along line 6—6;

Figure 7 is a view in vertical section through the control compartment showing a modified form of apparatus for maintaining the control compartment pressure slightly greater than the pressure in the weigh hopper compartment.

Figure 1:
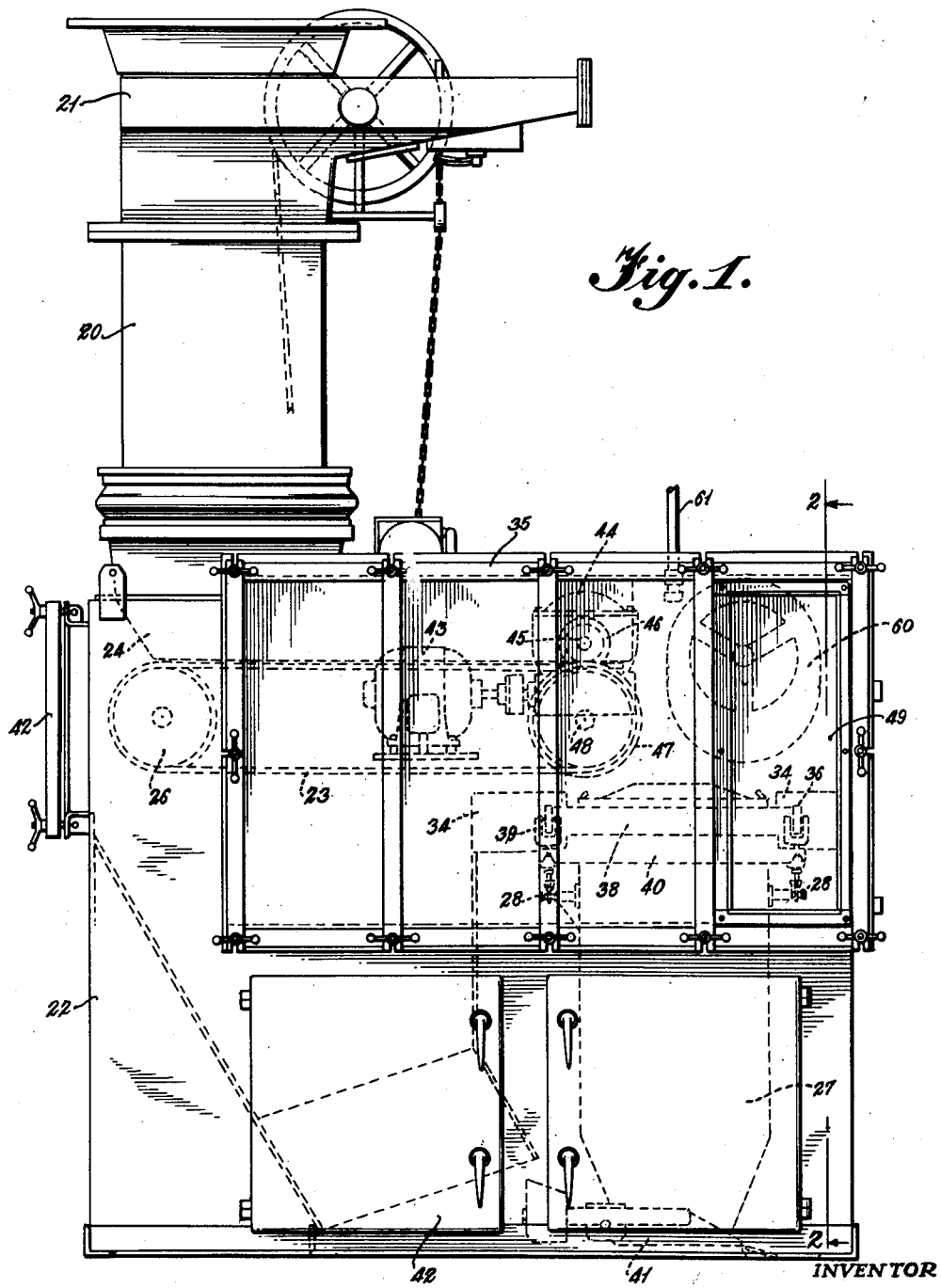
Figure 1 is a view in side elevation showing a pressurized coal scale for use with a feeding system for a pressure or vacuum furnace employing apparatus of the present invention.
Figure 2:
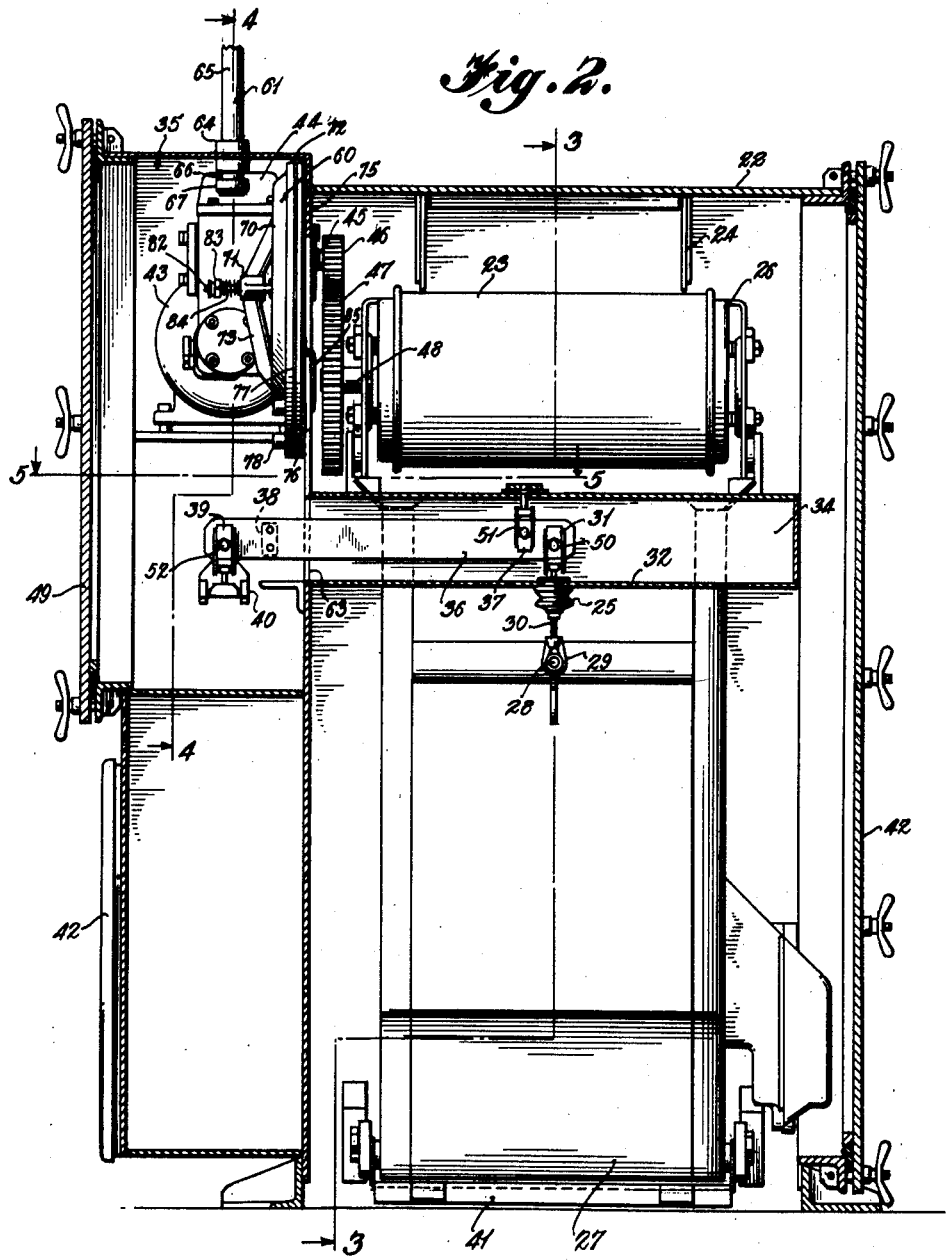
Figure 2 is a view in vertical section of Figure 1 taken along line 2—2.

Referring now to the drawings, Figures 1, 2, 3 and 5 show the apparatus that includes the pressurized coal scale. A downspout 20 having a conventional coal valve 21 at its upper end is joined by known means to a housing 22. It is to be understood that the top of the downspout 20 is normally connected or bolted to the bottom outlet of a coal hopper or bunker. The housing 22 encloses a conveyor assembly consisting of a feed belt 23 supported on pulleys 26. Skirt plates 24 are also arranged along the edges of the conveyor belt 23. These plates 24 depend from the top of housing 22. Also enclosed in the housing 22 is a weigh hopper 27. The above-described members are arranged inside housing 22 so that coal passing through downspout 20 will fall onto the rear end of belt 23. The coal falling off the forward end of belt 23 will be received in the weigh hopper 27.

The weigh hopper 27 has two pins 28 projecting from opposite sides. The pins 28 are given rigidity by a conventional strut arrangement 33. A loop 29 attached to one end of a shaft 30 is secured to each pin 28. The other ends of the shafts 30 project through partitions 32 and into compartments 34 where they are joined to scale-bearing loops 31. The shafts 30, at the points of projection through the partitions 32 are encased in molded rubber bellows 25 so that the compartments 34 are maintained pressure tight with respect to the space occupied by the weigh hopper 27 and the conveyor assembly. The compartments 34 communicate with an auxiliary housing 35. The scale-bearing loops 31 cooperate with pivot pins 50 rigidly fastened to weigh levers 36 to provide a knife edge attachment for the weigh hopper 27 with one end of weigh levers 36. A knife edge pivot is provided for each of the weigh levers 36 by pivot pins 51 rigidly fastened to weigh levers 36 cooperating with scale-bearing loops 37 which are similar to scale-bearing loops 31. The scale-bearing loops 37 are suspended from the top walls of the compartments 34. The other ends of the weigh levers 36 are interconnected by a bar 38 so that they will operate as a single unit. Scale-bearing loops 39 similar to scale-bearing loops 31 and 37 cooperate with pivot pins 52 rigidly fastened to weigh levers 36 to form a knife edge attachment for a counterweight 40 with the other ends of weigh levers 36. The counterweight 40 is suspended between the scale-bearing loops 39. The weigh hopper 27 is also conventionally provided with a pivoted counterweighted closure member 41 operated in a suitable manner such as by a solenoid to keep the member 41 locked shut. At the proper time the solenoid is de-energized and the weight of the coal in the hopper 27 causes the member 41 to swing open. When the hopper 27 is empty, the counterweight swings the member 41 shut and the solenoid is energized to effect the locking action. Doors 42 are also formed in housing 22 to permit access to the weigh hopper 27 and conveyor assembly.

The auxiliary housing 35 contains a motor 43, the shaft of which is connected to a gear reductor 44. The output shaft 45 of the gear reductor 44 passes through housing 22 and has a gear 46 mounted on its end. A gear 47 mounted on a shaft 48 meshes with gear 46. The shaft 48 is joined to the forward pulley 26. As above-described, the motor 43 is mechanically connected to the forward pulley 26 and thereby power is supplied to drive the conveyor belt 23. The auxiliary housing 35 is also provided with doors 49.

The auxiliary housing 35 also contains a check valve 60 communicating with the interior of housing 22 and an air inlet pipe 61. These two members are shown in detail in Figures 4 and 6. Referring first to Figure 4, it can be seen that the check valve 60 is mounted on the wall 75 separating auxiliary housing 35 and housing 22. The shaft 45 also projects through this wall as previously described. The crossbar 38, scale-bearing loops 39, and counterweight 40 attached to the ends of levers 36 are held in position in auxiliary housing 35. The levers 36 which lie substantially in compartments 34 pass into auxiliary housing 35 through slots 63.

The air inlet pipe 61 is situated in the top wall of auxiliary housing 35 and consists of a coupling 64 welded into a hole in the wall. The coupling 64 is internally threaded at both ends. A pipe 65, threaded at its end, is fitted into the outside end of coupling 64. This pipe 65 is attached to a supply of air under pressure. This attachment is not shown. A short pipe 66, threaded at one end, is fitted into the inside end of coupling 64. This pipe has at its other end a nozzle 67 in the form of an orifice 68. By the arrangement above-described, air is introduced into auxiliary housing 35.

Referring more particularly now to Figure 6, the check valve 60 mounted on wall 75 consists of a circular wheel 70 having a hub portion 71, a rim 72, and spokes 73. The undersurface of the rim 72 is undercut and is faced with a gasket 74 and forms a valve seat. The wall 75 is cut out as indicated in Figure 6 and the wheel 70 is applied to the opening by means of an intermediate plate 76. A gasket 77 is placed between the plate 76 and wall 75 and also between plate 76 and wheel 70. The assembly including the wheel 70, plate 76, and gaskets 77 is fastened to wall 75 by means of bolts 78. A circular member 80 having a raised lip 81 and a shaft 82 centrally mounted fits between the wheel 70 and plate 76. The lip 81 forms a valve head and fits against gasket 74. The end of shaft 82 projects through hub portion 71 and is screw-threaded and holds a nut 83 thereon. A compressed spring 84 is placed between the nut 83 and the hub portion 71 to hold the lip 81 tightly against gasket 74. A dust shield 85 is bolted to one side of plate 76 so that the air in auxiliary housing 35 can pass into housing 22 when the pressure of the air in the former exceeds that in the latter by an amount great enough to offset the force exerted by spring 84.

In operation, the apparatus just described, operates to counteract the weighing errors introduced by having the housing 22 at a substantially greater pressure than the auxiliary housing 35. The inlet pipe 61 is connected to a supply of air under pressure. The pressure of the air is at all times greater than the pressure of the air in housing 22. By means of orifice 68, air enters auxiliary housing 35 through pipe 61 at a slow rate. When the pressure in auxiliary housing 35 becomes excessively greater than the pressure in housing 22, the lip 81 will be forced away from gasket 74 by overcoming the force of spring 84 and air will pass from auxiliary housing 35 into housing 22 in the manner previously mentioned. Air will pass into housing 22 until such time as the pressure in auxiliary housing 35 is only slightly greater than that in housing 22, and the difference is so slight that the force of the spring 84 cannot be overcome. The check valve is arranged to provide a large area upon which air pressure may be exerted. A relatively weak spring is preferably utilized as spring 84 so that the pressure difference between the two housings will be very small. In the event the pressure in the housing 22 increases, this will force lip 81 into tight contact with gasket 74. The pressure in auxiliary housing 35 will gradually build up due to the introduction of air through orifice 68 until the pressure reaches a value sufficiently high enough to force lip 81 away from gasket 74. Inasmuch as the coal stream flowing through the apparatus is porous, the air which passes into housing 22 will escape through downspout 20 and the hopper or bunker of coal into the atmosphere. Since the interiors of molded rubber bellows 25 are open to compartments 34, the air piston effect upon them will cease when the pressures of compartments 34 and the weigh hopper compartment are substantially equal.

A modification of this invention is illustrated in Figure 7. In this arrangement an air inlet pipe 120 is introduced into auxiliary housing 35 and terminates within a chamber 121 in a frame 122. Pipe 120 is connected to a supply of air under a pressure greater than any which will ever exist in housing 22. The chamber 121 has two outlets 128 which form valve seats. The frame is mounted on the wall 75 between auxiliary housing 35 and housing 22 by means of bolts 123 and flange 124. A diaphragm 125 is held between flange 124 and wall 75. A shaft 126 having one end secured to the diaphragm 125 is provided with valve heads 127. The shaft 126 projects through chamber 121 and is arranged so that valve heads 127 can seat in outlets 128. The shaft 126 is bearing mounted by means of bearing assemblies 129. Thus it can be seen that if the pressure in housing 22 exceeds that in auxiliary housing 35 the diaphragm 125 will move the shaft 126 to open the outlets 128. Air will then pass into auxiliary housing 35 until the pressure therein equals or slightly exceeds the pressure in housing 22. The diaphragm 125 will then be deflected to close outlets 128.

Located directly beneath the previously described apparatus on wall 75 is a check valve for alleviating pressure differences in favor of auxiliary housing 35. A frame 140 is attached about an opening in wall 75 by means of bolts 141 and flange 142. A gasket 143 is arranged between the flange 142 and wall 75 to effect a gas-tight seal. The inner lip 144 of flange 142 is cut away to form a valve seat. A valve head 145 in the form of a disk having a lip around its outer edge is mounted for cooperation with the valve seat in the flange 142 by means of a shaft 146 centrally fixed thereto. The shaft 146 is bearing-mounted in assemblies 147. A pin 148 is rigidly secured to the shaft 146 and a compressed spring 149 biases the valve head 145 seated in flange 142 by pushing against the pin 148. A dust shield 150 is bolted to wall 75 and permits air to pass into housing 22 from auxiliary housing 35 when the valve head 145 is not seated. In the manner above described, a pressure difference in favor of auxiliary housing 35 can be alleviated. The difference in pressure will cause the valve head 145 to become unseated if it can exert a force exceeding that exerted by spring 149. Air will thereby flow into housing 22 until the pressures in the two housings are substantially equal. The spring 149 will then seat the valve head 145.

While this invention has been described in specific embodiments, nevertheless various changes and modifications obvious to one skilled in the art are within the spirit, scope, and contemplation of the present invention.

What is claimed is:

1. An apparatus for batch-continuous weighing of aggregate material that comprises an airtight housing divided into an air-tight hopper compartment and an air-tight weighing mechanism compartment, said hopper compartment normally being under other than atmospheric pressure, a weigh hopper positioned in said hopper compartment to receive and discharge said aggregate material as it passes through said compartment, a scale mechanism located in said weighing mechanism compartment, operating connections for said scale mechanism and said hopper extending between said compartments, means responsive to said scale mechanism for operating said hopper, means to supply air to said weighing mechanism compartment under a pressure greater than the pressure in said hopper compartment at a limited rate, and a check valve arranged to permit air to flow from the weighing mechanism compartment to said hopper compartment at a rate sufficient to balance the pressure in the two compartments.

2. An apparatus for batch-continuous weighing of aggregate material that comprises an airtight housing divided into an air-tight hopper compartment and an air-tight weighing mechanism compartment, said hopper compartment normally being under other than atmospheric pressure, a weigh hopper positioned in said hopper compartment to receive and discharge said aggregate material as it passes through said compartment, a scale mechanism located in said weighing mechanism compartment, operating connections for said scale mechanism and said hopper extending between said compartments, rubber bellows means sealing said operating connections, means responsive to said scale mechanism for operating said hopper, means to supply air to said weighing mechanism compartment under a pressure greater than the pressure in said hopper compartment, an orifice cooperating with said means to supply air to limit the rate thereof, and a check valve arranged to permit air to flow from said weighing hopper compartment to said hopper compartment at a rate sufficient to balance the pressure in the two compartments.

3. An apparatus for batch-continuous weighing of aggregate material that comprises an air-tight housing divided into an air-tight hopper compartment and an air-tight weighing mechanism compartment, said hopper compartment normally being under other than atmospheric pressure, a weigh hopper positioned in said hopper compartment to receive and discharge said aggregate material as it passes through said compartment, a scale mechanism located in said weighing mechanism compartment, operating connections for said scale mechanism and said hopper extending between said compartments, rubber bellows means sealing said operating connections, the interior of said bellows means being open to said weighing mechanism compartment, the exterior of said bellows means being exposed to said hopper compartment, means responsive to said scale mechanism for operating said hopper, means to supply air to said weighing mechanism compartment under a pressure greater than the pressure in said hopper compartment at a limited rate, and a check valve arranged to permit air to flow from the weighing mechanism compartment to said hopper compartment at a rate sufficient to balance the pressure in the two compartments.

4. An apparatus for batch-continuous weighing of aggregate material that comprises an air-tight housing divided into an air-tight hopper compartment and an air-tight weighing mechanism compartment, said hopper compartment normally being under other than atmospheric pressure, a weight hopper positioned in said hopper compartment to receive and discharge said aggregate material as it passes through said compartment, a scale mechanism located in said weighing mechanism compartment, operating connections for said scale mechanism and said hopper extending between said compartments, means responsive to said scale mechanism for operating said hopper, a frame mounted in said weighing mechanism compartment including a chamber, an outlet to said chamber constituting a valve seat, a diaphragm mounted in a wall dividing said compartments, a shaft connected to said diaphragm passing through said chamber, a valve head mounted on said shaft adapted to fit in said valve seat, means to supply air to said chamber under pressure greater than the pressure in said hopper compartment, and a check valve arranged to permit air to flow from said weighing mechanism compartment to said hopper compartment at a sufficient rate to balance the pressure in the two compartments.

5. An apparatus for batch-continuous weighing of aggregate material that comprises an air-tight housing divided into an air-tight hopper compartment and an air-tight weighing mechanism compartment, said hopper compartment normally being under other than atmospheric pressure, a weigh hopper positioned in said hopper compartment to receive and discharge said aggregate material as it passes through said compartment, a scale mechanism located in said weighing mechanism compartment, operating connections for said scale mechanism and said hopper extending between said compartments, means responsive to said scale mechanism for operating said hopper, rubber bellows means sealing said operating connections, a frame mounted in said weighing mechanism compartment including a chamber, an outlet to said chamber constituting a valve seat, a diaphragm mounted in a wall dividing said compartments, a shaft connected to said diaphragm passing through said chamber, a valve head mounted on said shaft adapted to fit in said valve seat, means to supply air to said chamber under pressure greater than the pressure in said hopper compartment, and a check valve arranged to permit air to flow from said weighing mechanism compartment at a sufficient rate to balance the pressure in the two compartments.

6. An apparatus for batch-continuous weighing of aggregate material that comprises an air-tight housing divided into an air-tight hopper compartment and an air-tight weighing mechanism compartment, said hopper compartment normally being under other than atmospheric pressure, a weigh hopper positioned in said hopper compartment to receive and discharge said aggregate material as it passes through said compartment, a scale mechanism located in said weighing mechanism compartment, operating connections for said scale mechanism and said hopper extending between said compartments, means responsive to said scale mechanism for operating said hopper, rubber bellows means sealing said operating connections, the interior of said bellows means being open to said weighing mechanism compartment, the exterior of said bellows means being exposed to said hopper compartment, a frame mounted in said weighing mechanism compartment including a chamber, an outlet to said chamber constituting a valve seat, a diaphragm mounted in a wall dividing said compartments, a shaft connected to said diaphragm passing through said chamber, a valve head mounted on said shaft adapted to fit in said valve seat, means to supply air to said chamber under pressure greater than the pressure in said hopper compartment, and a check valve arranged to permit air to flow from said weighing mechanism compartment at a sufficient rate to balance the pressure in the two compartments.

7. An apparatus for the weighing of aggregate material that comprises an air-tight housing divided into a first air-tight compartment for receiving aggregate material and a second air-tight compartment for housing a weighing mechanism, said first compartment normally being under other than atmospheric pressure, means in said first compartment to receive and discharge aggregate material as it passes through said compartment, a scale mechanism located in said second compartment, operating connections for said scale mechanism and said means to receive and discharge aggregate material extending between said compartment, means responsive to said scale mechanism for operating said means to receive and discharge aggregate material, means to supply air at a limited rate to said second compartment at a pressure greater than the pressure in said first compartment, and a check valve arranged to permit air to flow from said second compartment to said first compartment at a rate sufficient to balance the pressure in the two compartments.

ARTHUR J. STOCK.

References Cited in the file of this patent

UNITED STATES PATENTS

| Number | Name | Date |
|---|---|---|
| 570,299 | Richards | Oct. 27, 1896 |
| 1,037,824 | Fasting | Sept. 3, 1912 |
| 2,079,802 | Hauk | May 11, 1937 |
| 2,136,445 | Kramer | Nov. 15, 1938 |
| 2,138,356 | Ryan | Nov. 29, 1938 |